Dec. 22, 1936.    K. W. ROHLIN    2,065,198
HEATING SYSTEM AND VALVE MECHANISM THEREFOR
Filed May 23, 1935    5 Sheets-Sheet 1

INVENTOR
Karl W. Rohlin
BY
Ward, Crosby & Neal
ATTORNEYS

Dec. 22, 1936.　　　K. W. ROHLIN　　　2,065,198

HEATING SYSTEM AND VALVE MECHANISM THEREFOR

Filed May 23, 1935　　　5 Sheets-Sheet 4

INVENTOR
Karl W. Rohlin
BY
Ward, Crosby & Neal
ATTORNEYS

Dec. 22, 1936.  K. W. ROHLIN  2,065,198
HEATING SYSTEM AND VALVE MECHANISM THEREFOR
Filed May 23, 1935  5 Sheets-Sheet 5
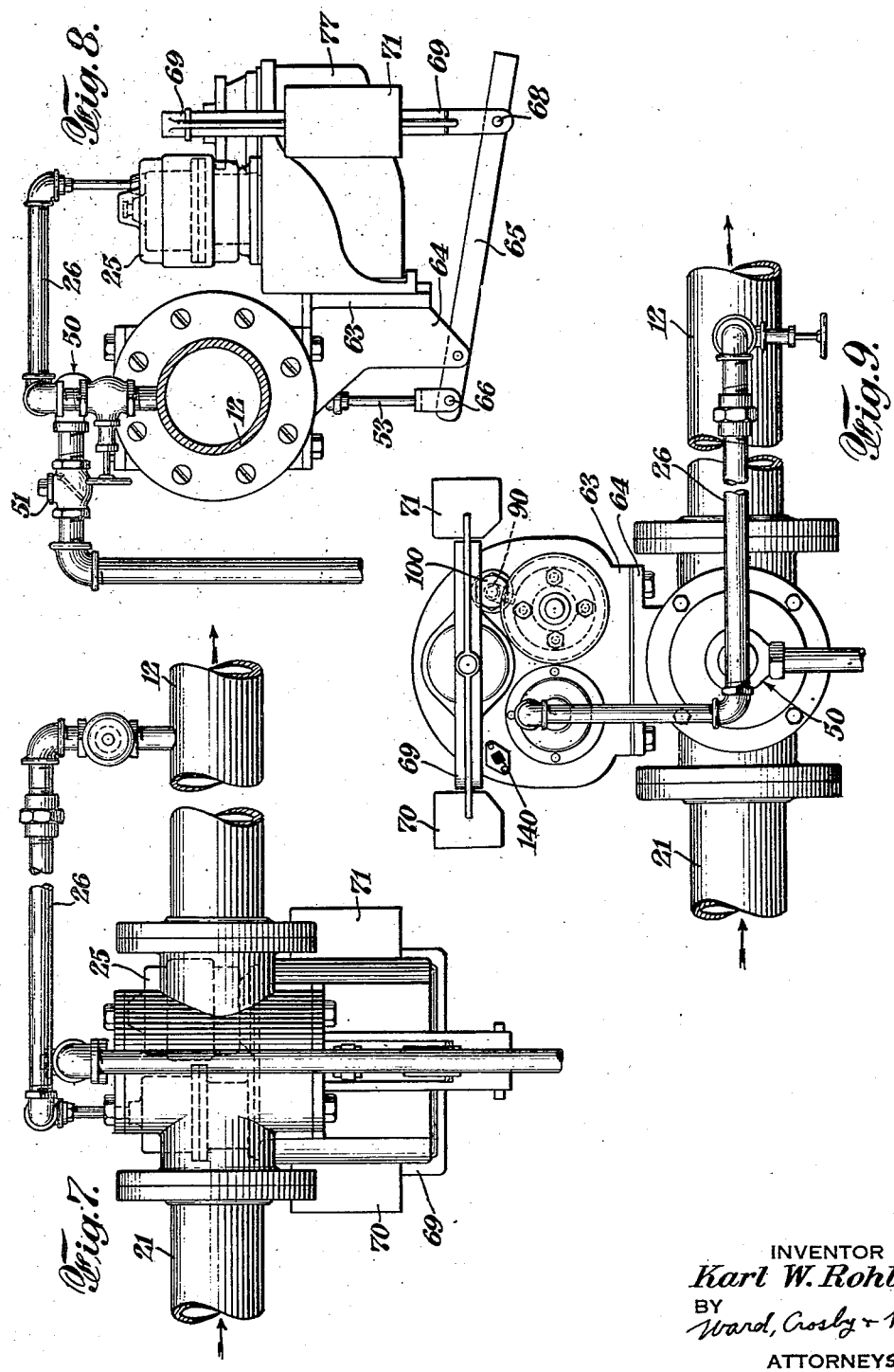
INVENTOR
Karl W. Rohlin
BY
Ward, Crosby + Neal
ATTORNEYS Patented Dec. 22, 1936

2,065,198

UNITED STATES PATENT OFFICE 2,065,198

HEATING SYSTEM AND VALVE MECHANISM THEREFOR

Karl W. Rohlin, Merchantville, N. J., assignor to Warren Webster & Company, Camden, N. J., a corporation of New Jersey Application May 23, 1935, Serial No. 23,080

6 Claims. (Cl. 237—9)

This invention relates to valve mechanisms and other apparatus and methods particularly adaptable for providing a measured supply and distribution of steam or the like in heating systems.

The purposes of the invention include the provision of improved heating systems and methods of steam distribution which will in practice, economically eliminate the causes of unsatisfactory operation, discomforts and wastefulness existing in various systems heretofore used. The invention is adaptable not only to new installations but also may be quickly and economically applied to existing systems of inferior design, to correct the unbalanced and uncontrolled steam supply and distribution therein. Also this invention provides a dependable and efficient valve mechanism and control equipment associated therewith, particularly adaptable for use with the heating systems above referred to.

The invention of this application relates in part to alternative embodiments of the inventions of my co-pending applications Ser. No. 19,397, filed May 2, 1935, entitled "Heat controlling systems", and Ser. No. 20,012, filed May 6, 1935, entitled "Method and apparatus for controlling heating systems".

In said application Ser. No. 19,397 apparatus and methods were disclosed for providing a measured supply and distribution of steam at predetermined pressure to a heating system intermittently at periods of regulated or adjustable length, depending upon the heating requirements. The present invention provides a somewhat similar system in connection with valve control mechanism, particularly adaptable for accurately and positively controlling large main steam valves, in such manner that the valve may be rapidly operated to accurately control the periods of intermittent steam supply and provide for the desired efficient pressure conditions within the piping system at all times during each cycle of operation of the valve.

Various further and more specific objects, features and advantages will clearly appear from the detailed description given below taken in connection with the accompanying drawings forming a part of this specification and illustrating by way of example various preferred embodiments of the invention. The invention consists in such novel features, arrangements, combinations of parts and methods as are described in connection with the apparatus herein disclosed, by way of example only.

In the drawings, Fig. 1 comprises a schematic diagram of a "one-pipe" heating system embodying certain features of my invention;

Fig. 7 is an elevational view of the mechanism of Fig. 3;

Fig. 8 is an elevational view taken at right angles to that of Fig. 7; and

Fig. 9 is a top plan view of the assembly shown in Fig. 7.

Figures 1, 2:
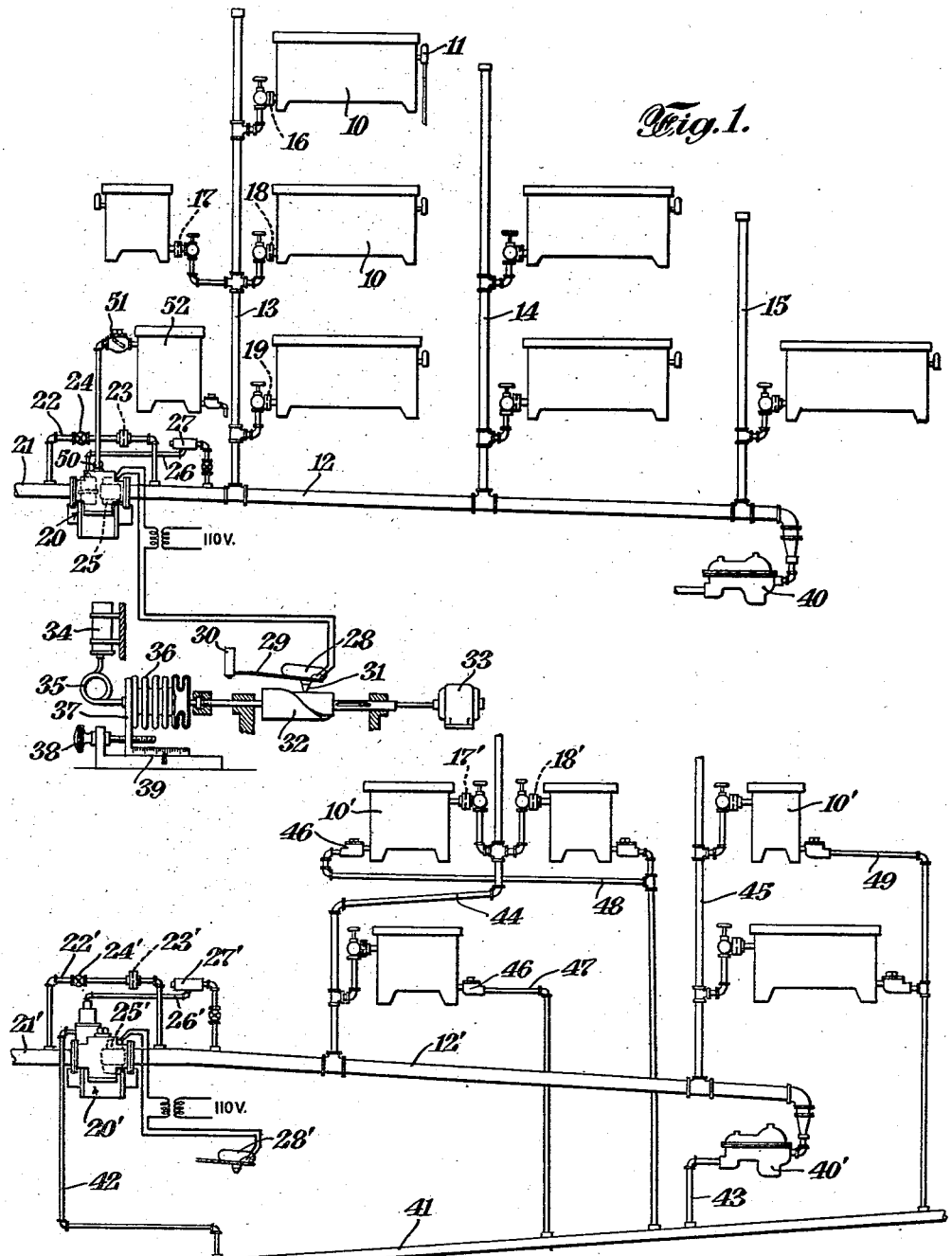
Fig. 2 is a similar diagram illustrating a "two-pipe" steam heating system.

In Fig. 1 a plurality of radiators as at 10 of a "one-pipe" steam heating system, is shown equipped with air valves or air line valves as at 11, and supplied with steam from a steam main 12 through risers as at 13, 14 and 15, which communicate with the various radiators respectively through inlets provided with normally fixed orifices as at 16, 17, 18 and 19. Steam may be supplied to the steam main 12 through a main steam valve shown with its associated control mechanism at 20, steam being furnished to this valve by a supply pipe 21, connected to a central heating plant, boiler or other suitable source of steam supplied either at a constant or somewhat varying pressure, preferably somewhat above the maximum pressure ordinarily desired in the steam main 12. The valve mechanism 20 is illustrated in further detail in Figs. 3 to 9, inclusive and described hereinafter.

A by-pass as at 22 may be provided around this valve, the by-pass preferably having a normally fixed orifice as at 23 and a shut-off valve as at 24.

The valve mechanism 20, as will be hereinafter explained in further detail, may be operated by a motor 25 in such manner that when current is applied to the motor, the valve will be moved toward open position, and when the current is cut off, the valve will be restored to or toward closed position, so that if current is supplied to the motor during a succession of relatively short spaced periods, the valve will be caused to be opened for admitting steam to the system during each of such short spaced periods. As will also be explained below, this valve mechanism 20 may be so arranged that during the "on" periods of steam supply, the valve will be opened to an extent depending upon the pressure in the steam main 12, so that the pressure of the steam supplied during the "on" intervals may be regulated at a predetermined value. For this purpose a steam pressure connection may be provided as indicated at 26 for applying the pressure of the steam main 12 to the valve control mechanism. This pressure connection may, if desired, be provided with a water accumulator as at 27 of sufficient size so that the static head of accumulated condensate therein and the condensate accumulated in the connection 26 will not vary sufficiently to materially alter the controlled pressure used at the valve mechanism 20 during the cycles of operation of the system. That is, the water accumulator permits the valve mechanism to be controlled in accordance with variations in the steam pressure in the steam main 12 without interference from fluctuations in height of the condensate in the pressure connection.

The electrical connections for controlling the motor 25 may, as shown, include a source of power, and a tiltable mercury switch as at 28. The switch 28 may for example be mounted on a spring arm 29 secured to a fixed support 30. The lower side of this arm may be provided with a detent 31 for engaging a cam 32 rotated by a motor or clock works 33. The longitudinal position of the cam 32 may be regulated thermostatically or adjusted manually. For example, a bulb 34 may be provided out-of-doors or at a suitable point where the temperature varies in proportion to the heating requirements of the system, or in some cases this bulb may be located in a "key room" where the temperature is kept at a level proportional to the desired temperature level to be maintained by the heating system. The bulb 34 may be connected as by a conduit 35 with an expansible bellows member 36 having swivel connection with the shaft carrying the cam 32. The bulb 34 and parts 35 and 36 communicating therewith, may be filled with a suitable fluid which will expand or contract materially in accordance with temperature changes and thereby cause the bellows 36 to expand or contract and thus regulate the longitudinal position of the cam 32 in accordance with the temperature conditions at the bulb 34. For manually adjusting the position of the cam, a support 37, thumb screw 38 and graduated dial as at 39 may be provided, for example.

The cam 32 may be provided with a surface such that the mercury switch is caused to be tilted to a position to intermittently open and close the motor circuit; that is, the cam may be provided with a raised surface of varying area along the length of the cam, so that when the position of the cam is adjusted in accordance with temperature changes, the motor circuit will be accordingly opened during spaced periods and the proportion of elapsed time occupied by such periods may be regulated thermostatically or adjusted manually in the above described manner. Similar circuit controlling means and the operation thereof are described in the patent to Owens, Reissue No. 19,507, granted March 19, 1935, and accordingly the details of this part of the mechanism need not be here further explained.

The normally fixed orifices as at 16 to 19, are so designed as to restrict the flow of steam to each radiator respectively to a normally fixed predetermined extent, depending upon the normal heating capacity thereof and the access of the steam source thereto, whereby at the beginning of and during each of the "on" periods of steam flow, steam is supplied to the various radiators respectively in amounts bearing substantially the same proportional relationship for each radiator, to its heating capacity. The details of construction of such orifices and the manner in which the same may be utilized in systems of this type, are further explained in my copending application Ser. No. 19,397 above referred to.

The by-pass 22 with its normally fixed orifice 23 may be so designed as to supply a small amount of steam to the piping system during the "off" intervals when the main valve at 20 is closed, whereby during such intervals the piping system is kept heated, ready for the prompt supply of steam to the various radiators immediately upon the beginning of each "on" period of steam flow. The steam supplied through the by-pass during the "off" intervals, however, is preferably made insufficient to cause any substantial amount of steam to flow through the radiator inlet orifices during such intervals. The manner in which such by-pass may be operated in connection with systems of this type is also further explained in connection with my said copending application Ser. No. 19,397. However, under some circumstances, with the main steam valve and control mechanism hereinafter described, the use of such by-pass may be unnecessary.

As explained in my said copending application Ser. No. 19,397, it is sometimes desirable, although not always necessary, to provide an exhaust valve for permitting the rapid withdrawal of steam from the piping at the beginning of each "off" interval in the operation of "one-pipe" systems of this type, so that a slight vacuum or relatively low pressure condition will occur in the steam supply piping soon after the beginning of each "off" interval for aiding in the withdrawal of the condensate from the radiators during such intervals. In the system as shown in Fig. 1. such a "quick exhaust" valve is schematically indicated at 50. Its construction and relation to the valve mechanism 20 will be described hereinafter. Steam exhausted through the valve 50 may be passed through a check valve as at 51 to a special radiator 52. The check valve 51 will serve to prevent the return flow of fluid to the piping system.

As indicated at 40 a suitable steam trap may be provided through which the condensate may be withdrawn from the steam main 12.

In Fig. 2 a "two-pipe" system is illustrated. Parts similar to those of Fig. 1 are identified by corresponding numerals accompanied by prime marks, and in so far as such parts are similar in both figures, the description need not be repeated. In Fig. 2, however, the valve 20' may be controlled so as to regulate the flow of steam to the steam main 12' to normally maintain a predetermined pressure difference as between the pressure in the steam main 12' and the pressure in a return main 41. Therefore, a pressure connection 26' is provided to the steam main 12' and in addition, a pressure connection 42 is provided to the return main 41.

In Fig. 2, condensate from the steam trap 40' may be conducted as by a conduit 43 to the return main 41. The return main 41 may be of the "open return" type where the condensate is returned by gravity or by means such as disclosed in the patent to Serrell et al. No. 1,555,081, granted September 29, 1925, or a closed return system may be used with the return main connected to a suitable apparatus for maintaining a partial vacuum therein. If desired, the valve at 20 may be simply used to regulate the pressure during the "on" periods of steam supply and a separate valve may be used to intermittently interrupt the flow at intervals of adjusted or regulated length.

The steam main 12' may be connected to the various radiators through risers as at 44, 45, and each of the radiators may be provided at their outlets with steam traps as at 46 of conventional type, from which condensate may be returned to the return main 41 through pipes as at 47, 48, 49.

Figure 3:
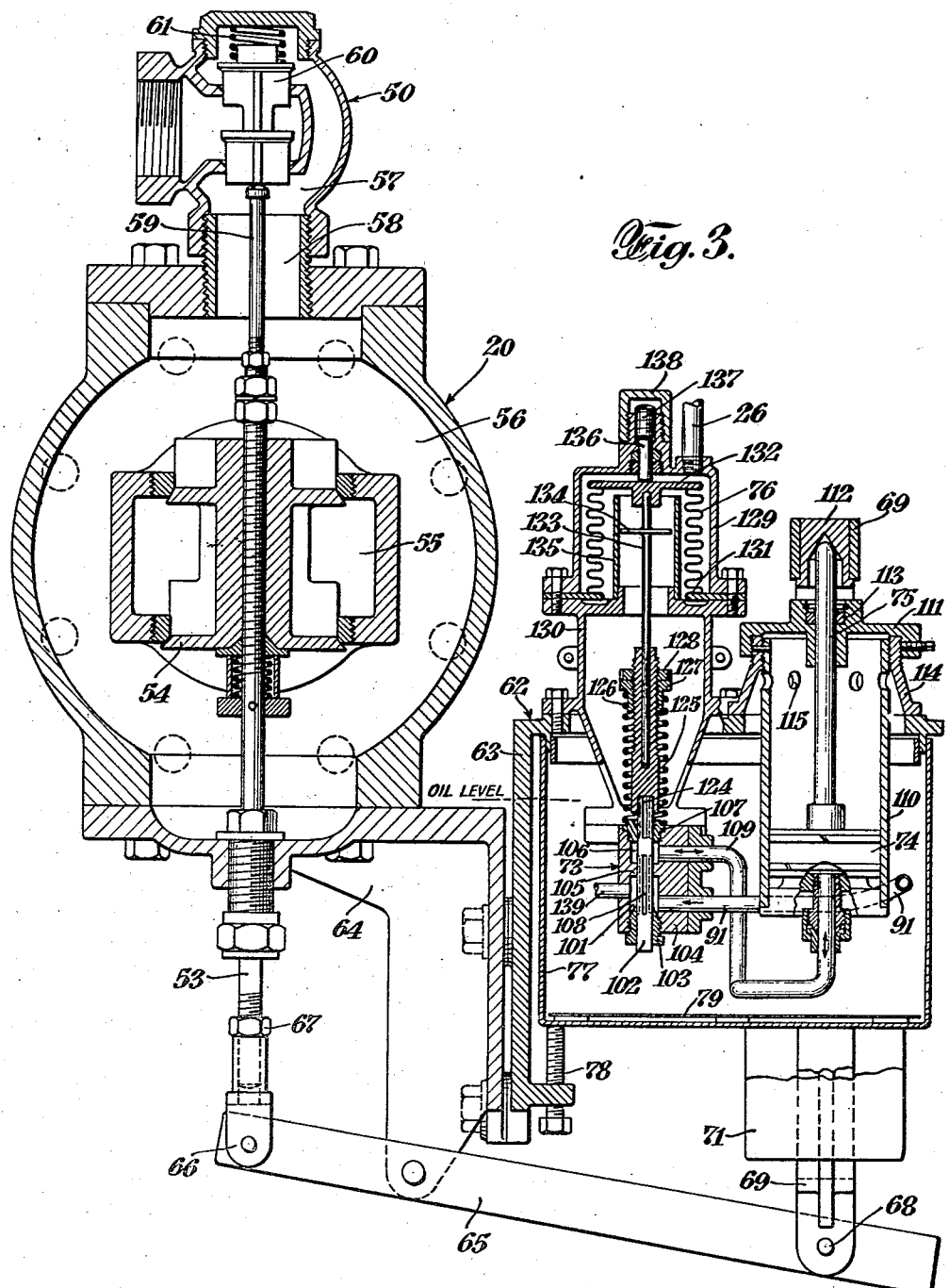
Fig. 3 is a vertical sectional view through a main steam valve, such as may be used in the systems above referred to, together with certain control equipment therefor and a "quick exhaust" valve associated with the main steam valve.

Reference will now be had to Fig. 3 illustrating in part the valve 20 and associated mechanism. The valve itself may be of a conventional type, such for example as used in relatively large heating systems. It may embody a valve stem as at 53 for controlling the position of a valve piece 54. The passage communicating with the source of steam supply is indicated at 55, whereas the passage communicating with the heating system is indicated at 56. The "quick exhaust" valve 50 above referred to, is here shown with passages at 57 and 58 communicating with the passage 56. The valve stem may be extended as at 59 for operating a valve piece, as at 60 in the exhaust valve, in opposition to a restoring spring as at 61.

In Fig. 3 the valve controlling mechanism is illustrated at 62. This mechanism may be mounted on a supporting bracket 63 carried by bracket 64, which may also carry or be supported by the main valve as indicated. Thus whenever the main valve is closed, the exhaust valve is opened, and vice versa.

The position of the valve stem 53 may be controlled by a lever 65 pivotally mounted on the bracket 64 and pivotally connected at one of its ends as at 66 to the valve stem 53, through an adjustable screw connection 67. The other end of the lever 65 may be pivotally connected as at 68 to a yoke member 69 (Figs. 3, 4), which yoke member may have a pair of arms extending upwardly at each side of the control mechanism and joined at their upper ends. The arms of this yoke member may be provided with weights 70 and 71 for urging the lever 65 to a position such that the main steam valve will be held normally closed, or restored to normal position whenever the valve controlling apparatus is inactive.

Briefly stated, the valve controlling apparatus may comprise the motor 25 (see Figs. 4 and 8) for operating a gear pump 72 (Fig. 4) for supplying fluid pressure through a pilot valve 73 (Fig. 3) to regulate the height of a piston 74, which in turn applies pressure through a push rod 75 to the yoke 69. The position of the pilot valve 73 may be regulated in turn by the position of an expansible bellows or diaphragm member 76, which is subjected to the pressure of the steam main 12 through connection 26 above referred to.

This pilot valve and its operating mechanism, as well as the motor 25, the piston 74, pump 72 and associated parts, may preferably be mounted upon or within the cover of a fluid reservoir 77 for containing the fluid supply for the pump and which fluid is used to control the position of the piston. By thus mounting these parts in this closely assembled relationship within and upon the reservoir, the precautions necessary to prevent leakage or spilling of the fluid are greatly reduced and at the same time a compact rigid assembly of the various units is readily made possible, and yet each of them may be readily inspected, removed or replaced whenever repairs or adjustments are necessary.

The fluid used in the valve control apparatus may comprise a suitable grade of oil. The reservoir casing as shown may fit around the lower ends of the various operating units and may be held up in sealing engagement with the cover of the casing, as by set screws as indicated at 78. Thus, the casing 77 and the fluid contained therein may be readily removed, and then the lower portions of the operating parts of the assembly are largely exposed for ready repair or adjustment without necessarily removing the same from their mountings on the cover of the reservoir. A sheet of wire mesh or other suitable material may be provided at 79 within the reservoir, spaced slightly above the bottom so as to provide a space for possible accumulation of sediment in the body of oil, at points where it will not be subject to the turbulent conditions in the oil above, and hence any such sediment will be kept from circulating through the mechanism.

The details of construction of the various units of this assembly will now be described. The motor 25 may be of any conventional type suitable for the source of power available. It may be provided with a dust cover 80 and may be mounted upon a suitable support as at 81 extending up from the cover of the oil reservoir. The motor shaft may be connected through a suitable well-known form of flexible insulating coupling as at 82 to a pump shaft 83. A suitable bearing structure as at 84 may be provided for the pump shaft and supported in a bracket 85 bolted to the under side of the reservoir cover 86. Bolts as at 87 for this purpose may also serve to retain the pump assembly 72 up against the lower side of the bracket 85. The pump 72 may be of any well-known type of gear pump suitable for creating the desired oil pressure. It may have an intake at 88 opening into the body of oil in the reservoir, and an outlet as at 89 communicating first with a pressure release valve at at 90 (Figs. 4, 5), and then with a conduit 91 running to the pilot valve. This pressure release valve serves to release pressure created in the circulating fluid to such an extent as may be necessary to normally maintain a substantially predetermined pressure at the intake of the pilot valve whenever the motor is operating. One example of such a release valve is illustrated in Fig. 5 and may include a valve seat as at 92 against which a steel ball 93 comprising the valve member, is normally urged by a spring 94. The tension on this spring may be adjusted for adjusting the release pressure by means of a screw cap 95 which may be locked in position by another screw cap as at 96 having threaded engagement with a cylindrical supporting barrel 97 for the valve. Exit holes as at 98 provide for the escape to the oil reservoir of such fluid as passes through the release valve. The fluid coming from the pump which does not thus escape, may pass through an aperture as at 99 to the conduit 91. In order to inspect or adjust the release valve, access may be had thereto through an opening in the cover of the fluid reservoir, which opening may be normally filled by a plug 100 (Figs. 5, 9).

Referring now to Fig. 3, the fluid conduit 91 may communicate with a lower chamber 101 of the pilot valve 73. A slidable valve member 102 extends through this chamber, the lower end of this valve member being slidable in a screw plug 103 mounted in the body 104 of the pilot valve and serving to plug the lower end of the chamber 101. The body of the valve may be formed with a partition 105 separating the lower chamber 101 from an upper chamber 106. The valve member may extend slidably through this partition and through the upper chamber 106 and then through a screw plug 107, which plugs the top of the chamber 106. The surfaces of the valve member 102 which slidably engage the wall 105, may be formed with a plurality of longitudinal grooves at 108. When the pilot valve is in its uppermost or open position, these grooves extend from above the wall 105 down along the surfaces of the rod 102 within the lower chamber 101 and provide passages for the flow of fluid from the conduit 91, through the lower chamber 101, through the grooves 108 and into the upper chamber 106. From this upper chamber the fluid may pass through a conduit 109 to a cylinder 110 within which the above mentioned piston 74 operates. The lower end of the cylinder 74 may be suitably sealed as shown, against the escape of fluid, except through the conduit 109. The fluid entering the cylinder through this conduit causes the piston 74 to rise together with the push rod 75 attached thereto. The push rod may be slidably mounted within a cap member 111, secured to the top of the cylinder. The upper end of the push rod may extend through this cap member and into engagement with a socket member 112 carried by the above mentioned yoke member 69. Suitable packing means as at 113 may be provided for sealing the opening where the push rod passes through the cap member 111 against the escape of oil at this point. The cylinder 110 may have threaded engagement at its upper end with a suitable supporting flange as at 114 mounted on the cover of the reservoir. Openings as at 115 may be provided through the walls of the cylinder 110 for the escape back to the reservoir of any oil which may leak past the piston 74.

As appears from another view of the pilot valve member 104 (Fig. 4), a passage 116 may be provided in communication with the upper valve chamber 106. The other end of the passage 116 communicates with the fluid reservoir through a pressure controlled valve 117 and an opening 118. The valve 117 may be mounted as shown, within a chamber formed in the member 104 and may comprise a slidable valve piece 119, a restoring spring 120 and valve seat 121 within which the opening 118 may be formed. An annular cap member 122 fastened as by screws on to the member 104, serves to retain the valve parts within the valve chamber. A passage as at 123 serves to bring the lower pilot valve chamber 101 into communication with the valve piece 119, so that when the lower pilot valve chamber is subjected to substantially normal fluid pressure from the pump, the valve piece 119 is moved against the spring 120 to closed position, thus normally closing the passage 116. However, when the motor 25 is cut off so that the pressure supplied from the pump is interrupted to a substantial extent, then the spring 120 serves to move the valve piece 119 to open position with the result that fluid may quickly escape from beneath the piston 74 through the conduit 109, the upper pilot valve chamber, cavity 116, out through the opening 118 to the fluid reservoir. Thus the piston 74, because of the weights 70 and 71, will be quickly moved to its lowermost position for closing the main steam valve 20 very rapidly as soon as the current to the motor is cut off.

The upper surface areas of the pilot valve member 102, which are slidably received within the plug 107, may be formed with longitudinal slots as at 124 (Fig. 3). These slots may terminate at a point such that when the pilot valve is in fully open position, as shown in Fig. 3, these slots do not extend down into the upper pilot valve chamber 106. However, when the pilot valve member is moved downwardly toward its closed position to a variable extent, then the slots 124 will extend to a corresponding variable extent into the upper valve chamber and thereby permit release of fluid pressure at this point to an extent depending upon the position of the valve. The upper end of the valve member 102 may be fixed within a connecting member 125 which is surrounded by a coil spring 126. The lower end of this spring bears against the plug 107 and its upper end bears against a member 127 having threaded engagement with the member 125, so that by adjusting the position of the member 127 along the member 125, the tension of the spring 126 may be adjusted and then fixed by lock nut 128 engaging the member 127. The position of the pilot valve member is regulated by the above mentioned expansible bellows or diaphragm 76, which may be mounted as shown within a housing 129, the space within which communicates with the above mentioned pressure connection 26. The housing 129 may be bolted to a support 130, which in turn may be mounted within the cover of the fluid receptacle. The lower end of the support 130 may extend down as shown, to form a support for the valve member 104 and associated parts.

The lower end of the expansible bellows member 76 may be sealed as at 131 in respect to the walls of the chamber 129. A disc member 132 may be sealed within the upper end of the expansible bellows member. A push rod 133 extends from the disc 132 to the member 125 so that upon compression of the expansible bellows member, the pilot valve is moved to a corresponding extent toward closed position against the pressure of the spring 126. The push rod 133 may be provided with a disc 134 for slidably engaging a cylinder 135 for holding the parts in proper alignment during assembly. A slidable plug 136 may be mounted within the top of the chamber 129 for limiting the upward movement of the expansible bellows. At the point where this plug passes through the top wall of the chamber 129 it may be sealed by suitable packing as shown against escape of fluid. The vertical position of this plug may be adjusted as by a set screw 137, which in turn may normally be kept sealed as by a cap 138.

Figure 4:
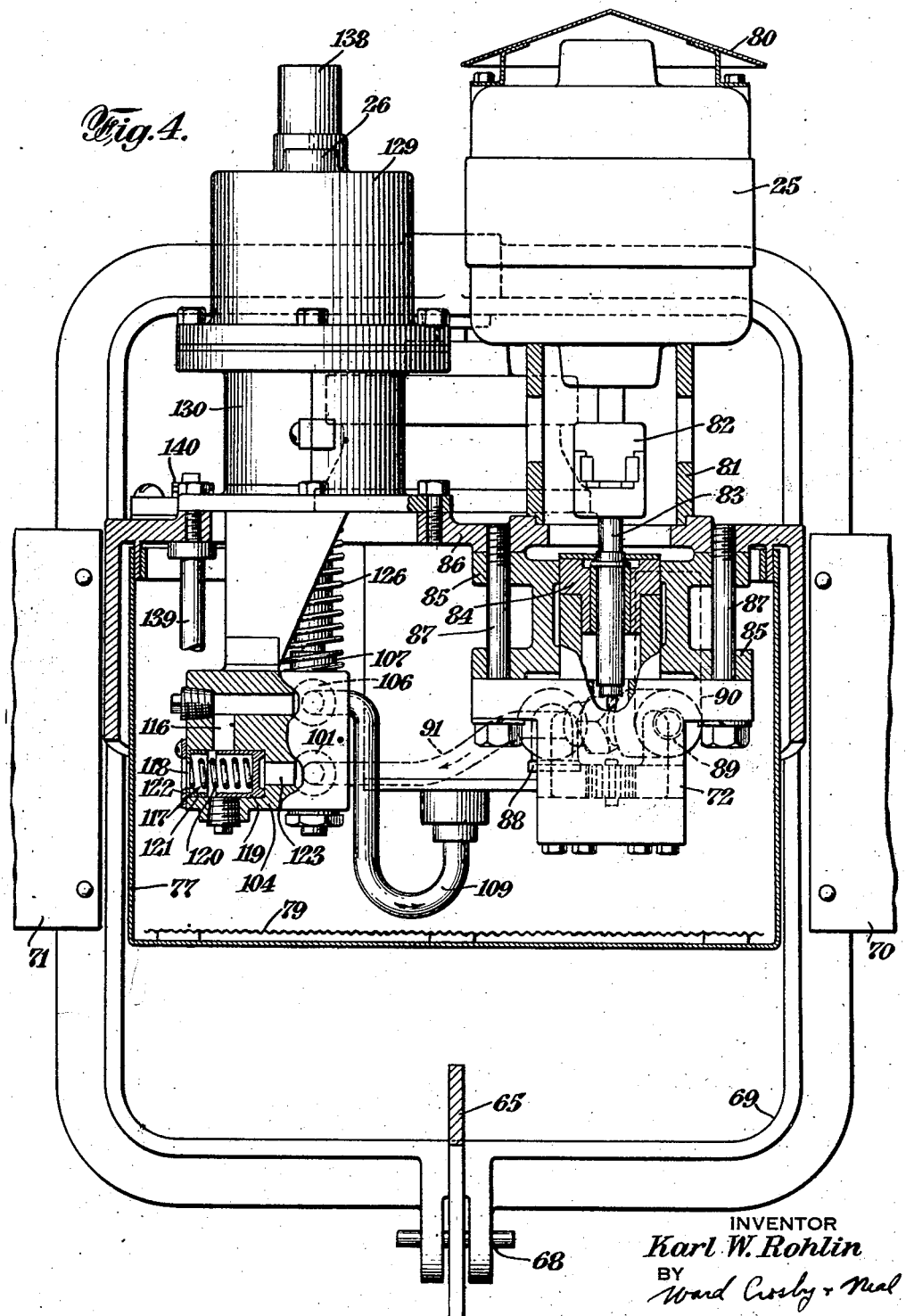
Fig. 4 is an elevational view partly in section of the control equipment of Fig. 3.
Figure 5:
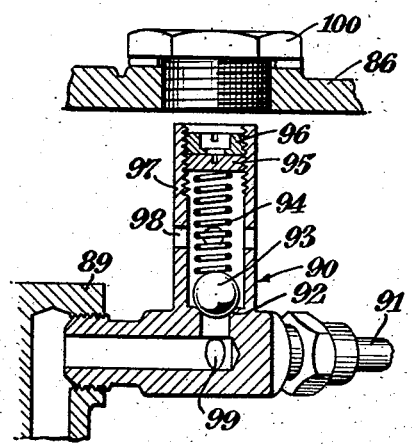
Fig. 5 is a sectional view of certain details of the mechanism of Fig. 4.

In order to test the pressure of the fluid supplied to the pilot valve, a conduit 139 (Fig. 3) may be provided opening into the lower pilot valve chamber and extending up to a normally plugged outlet 140 in the cover of the fuel reservoir (Figs. 4, 9). When it is desired to test this pressure, the plug 140 may be removed and replaced by a pressure gauge, thus conveniently affording an opportunity for making such a test without disturbing the operation of the assembly.

One complete cycle of operation of the valve control mechanism will now be described. Let us assume that the main steam valve is closed as shown in Fig. 3 and the control equipment is inactive, with the piston 74 in its lowermost position. Thereupon if the motor 25 is started, the pump 72 will immediately cause fluid under pressure to flow into the lower pilot valve chamber 101 through the slots 108 to the upper chamber, thence through the conduit 109 to the cylinder 110. As soon as this pressure reaches a substantial value, the piston 74 will be raised, causing the main steam valve to be correspondingly opened. The operation of the piston 74 is quite sensitive to variations in the fluid pressure and the vertical position of the piston will be varied in accordance with the quantity of fluid admitted beneath the piston. Also the linkage connecting the piston with the main steam valve is such that the extent to which the steam valve is opened is also correspondingly accurately regulated. It will be also noted that the adjustments of the main steam valve are caused by a source of power, namely the oil pressure created by the motor and pump, which is independent of the steam pressure in the system, except that the oil pressure which is effective on the piston is controlled by the steam pressure. Accordingly power is available for decisively and accurately adjusting the main steam valve in response to slight variations in the steam pressure of the heating system even though such variations might be far too small to be utilized to directly control a main steam valve in the manner of the usual pressure regulating valves. Thus, with the apparatus as above described, a main steam valve suitable for a very large system may be accurately controlled even though the steam pressure is slight as in moderate weather, and the variations of such pressure are very small.

As soon as a predetermined pressure is established by the pump 72 in the conduit 91, any excess pressure will be released by the release valve 90 (Fig. 5) so that thereafter so long as the motor is running, the pressure in the lower pilot valve chamber 101 will remain substantially constant. However, in a very short time, sufficient fluid will have been pumped into the cylinder 110 to raise the piston 74 to its uppermost position and accordingly the main steam valve also will be moved very quickly to its fully open position and thus admit steam to the piping of the heating system with sufficient promptness and in such volume as to cause the steam to be at once distributed in the proper manner through the inlet orifices of all the radiators of a system. As soon as pressure is thus established in the steam main 12, the expansible bellows 76 will also be subject to a corresponding pressure through the pressure connection 26. As a result, the pilot valve member 102 will be moved downwardly so that the slots 108 are closed off or partially closed at the pilot valve partition 105, preventing or checking further flow through the conduit 109 to the piston. At the same time if such movement of the pilot valve is very substantial, the slots 124 on the valve member 102 will be moved downwardly sufficient to allow fluid to escape from the upper pilot valve chamber and hence also from beneath the piston back to the fluid reservoir, thus allowing the piston to fall for closing, or partly closing the main steam valve. This in turn will bring about a reduction in the pressure on the expansible bellows 76 and thus tend to permit the pilot valve to move again toward open position. As further changes in the pressure occur in the steam main 12, resulting for example from variations in the heating requirements of the system or otherwise, the position of the pilot valve, the piston 74 and the main steam valve will be automatically regulated so as to always tend to maintain the desired constant steam main pressure, while the motor 25 continues to run. Such pressure may be adjusted by adjustment of the spring 126.

After the heating system has thus been supplied with steam at regulated pressure during an "on" period of desired length, then the circuit to the motor 25 may be cut off either by the thermostatically or manually controlled apparatus indicated in Fig. 1, or by other circuit controlling apparatus, such for example as shown in my above mentioned copending application Ser. No. 19,397. Immediately upon thus stopping the motor, the pressure in the conduit 91 will fall sufficiently to permit the release valve member 119 (Fig. 4) to move into the position shown, thus opening the passage 116 for the quick escape of the oil pressure from beneath the piston 74, and thus quickly closing the main steam valve. It will be understood that during the running of the motor and while the pressure in conduit 91 is normal, the valve member 119 will be moved toward the left (Fig. 4) for maintaining the passage 116 closed.

Thus mechanism is provided not only for very quickly opening and closing the main steam valve even though it may be of unusually large dimensions, but also during the "on" periods of steam flow, the degree of opening of the valve may be very finely regulated in accordance with slight variations in the steam pressure of the system and regardless of whether the steam pressure is at its maximum, or is very slight, as for example during the moderate weather conditions under which most heating systems operate much of the time.

If it is found necessary or desirable to use the "quick exhaust" valve 50 above described, this valve, as will be readily understood, may also be so adjusted as to open concurrently with the shutting of the main steam valve, thus promptly reducing the pressure in the steam piping so that the condensate accumulated during the previous "on" period of steam flow in the radiators may be promptly withdrawn from the radiators through the risers in the case of "one-pipe" systems. If the valve 50 is not used, the valve rod extension 59 may of course be removed and the passage 58 may be plugged.

The above described valve control mechanism is particularly adaptable for use with the systems above referred to, wherein the steam is supplied intermittently during each of a succession of "on" periods of steam flow, interrupted by "off" intervals for permitting the condensate to be withdrawn from the radiators. With such systems, the quantity of steam supplied may be accurately regulated in accordance with the varying heating requirements of the system, by varying the proportion of the elapsed time occupied by the "on" periods. In order that the duration of such "on" periods may be dependably and accurately timed in proportion to the heating requirements, it is of considerable importance to provide main steam valve control means which will operate quickly to open the valve to first admit steam in large quantities to insure its prompt distribution in proper proportions to all parts of the system, and thereafter during the remainder of the "on" period maintain as accurately as possible the predetermined pressure or pressure difference in the piping system, and then when the "on" period is to terminate, promptly closing the main valve. The above described valve controlling mechanism accurately and dependably fulfills these various requirements.

Figure 6:
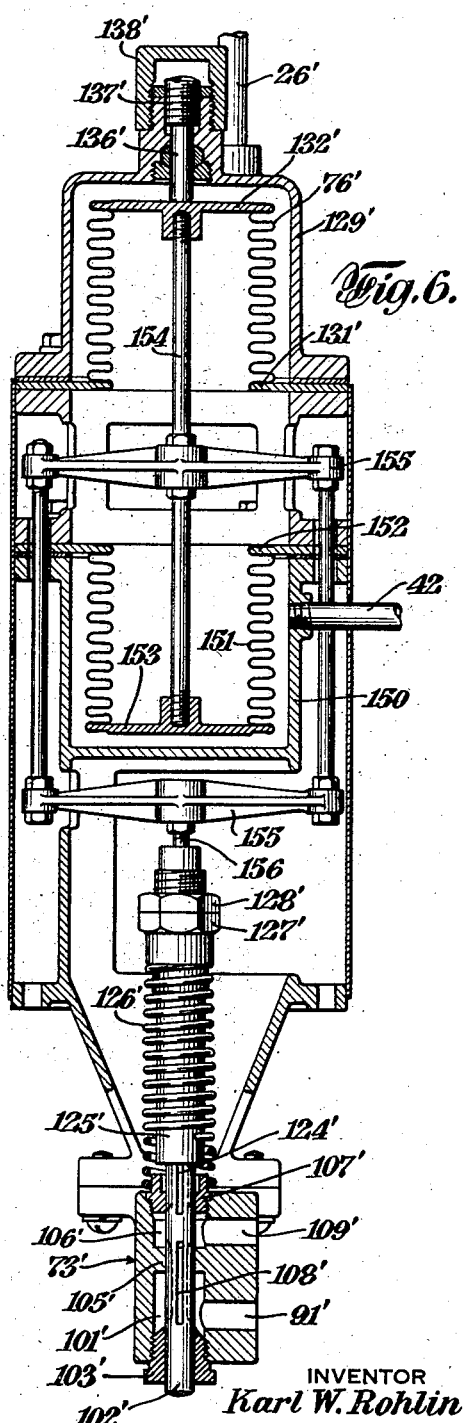
Fig. 6 illustrates an alternative embodiment of one of the parts of the mechanism of Fig. 3.

Fig. 6 illustrates an alternative embodiment of operating means for the pilot valve for use with the system of Fig. 2, or other vacuum or closed return systems, wherein the pilot valve is regulated to maintain a predetermined difference of pressure between the supply and return mains. In general, the construction as shown in Fig. 6 is similar to that of the pilot valve operating means above described in connection with Fig. 3 and corresponding parts are identified by the same numerals accompanied by prime marks. However, in this embodiment the above mentioned pressure connection 42 leading from the return main communicates with a diaphragm or expansible bellows chamber 150 containing a bellows member 151 similar to the bellows members 76 and 76', but connected to apply force in the opposite direction. The upper edges of the bellows 151 may be sealed as at 152 in respect to the walls of the chamber 150. The lower end of this bellows may be sealed by a disc 153 similar to the discs 132 and 132'. The discs 153 and 132' may be interconnected by a rod 154 carrying a yoke assembly 155 which in turn may be connected to push rod 156 corresponding in function to the rod 133 of Fig. 3. It will be apparent that the embodiment of the pilot valve shown in Fig. 6 operates in a manner similar to the pilot valve shown in Fig. 3, but that the motion imparted to the valve rod by the diaphragm or bellows 76' is modified by the action of the bellows 151. That is, the force applied to the valve rod will be proportional to the difference between the pressures applied to these two bellows and thus the main steam valve will be regulated to maintain a predetermined pressure difference between the supply and return mains.

With the above described systems, steam may be admitted through the main steam valve during each of the short "on" periods varying in length for example from a small fraction of a minute during relatively warm weather to from 5 to 10 minutes during coldest weather. The equipment will satisfactorily operate with most systems if adjustment is made for providing an "on" period of in the neighborhood of 10 minutes when the system is subjected to maximum heat demand. At the same time, the mercury switch operating cam should preferably be so designed that during each cycle of operation an "off" interval of at least a predetermined length will occur (for "one-pipe" systems particularly) sufficient to allow the greater part of the condensate accumulated in the radiators during the "on" period to drain out through the restricting inlet orifices and through the risers even when the system is subjected to its most severe heating requirements. In systems of average type and size, such a predetermined minimum "off" interval in the neighborhood of one minute is sufficient.

The frequency of the cycles of operation, if desired, may be adjusted by adjustment of the speed of rotation of the switch operating cam so as to be suitable for the capacity and extent of the radiating system. The "on" periods may thus be made of sufficient frequency to enable substantially continuous maintenance of predetermined temperatures in the spaces heated by the radiators, and with the proper design of the orifice apertures, each of the radiators respectively during each period may be heated to substantially the same proportion of its maximum capacity.

During the "off" intervals the by-pass around the main steam valve may be used to supply a sufficient amount of steam to maintain the piping in heated condition and the orifice in the by-pass should preferably be made with an aperture just sufficient to admit enough steam to keep the conduit system thus heated but without causing any substantial amount of steam to pass into the radiators during the "off" intervals. Also in some cases, it may be advisable to restrict the flow of steam through the by-pass to such an extent that during the greater part of the "off" intervals there will be a slight vacuum within the conduit system for aiding in the withdrawal of the accumulated condensate from the radiators during such intervals.

With the conduits thus kept filled or partially filled with steam during the "off" intervals, upon the beginning of each "on" period, an effective flow of steam will promptly start through all of the radiator inlet orifices at substantially the same time. Thus from the beginning of each of said "on" periods, steam is supplied through the restricting orifices to the various radiators respectively in amounts bearing substantially the same proportional relationship for each radiator, to its heating capacity.

However, as above indicated, the by-pass may not be necessary in many cases, where the above described valve arrangements are used.

In the "one-pipe" type of system at the beginning of each "off" interval, the condensation of steam in the radiators will soon tend to create a slight vacuum therein, but the air valves if not already open, will soon open, and permit substantial quantities of air to be drawn into each radiator and this air will aid in expelling the accumulated condensate from the radiator through the restricted inlet orifice, unhampered by any incoming steam. This action will, as above stated, be further aided if the conduits are maintained at a slight vacuum during the greater part of the "off" interval. Thus all or the greater part of the condensate accumulated in the radiators during the previous short "on" period may be very quickly withdrawn, and in fact substantially forced back into the conduit system quite promptly, notwithstanding the orifice restrictions. Thus the orifices at the various radiators may be used to full advantage in distributing the periodic supplies of steam in proper proportions to various parts of the system unhampered by any substantial accumulations of condensate, yet at the end of each "on" period the resulting small accumulations of condensate are promptly expelled unhampered by any countercurrent flow of steam. Instead, the removal of the condensate is in fact aided by the slight vacuum conditions resulting from condensation of steam of the previous period.

If as above indicated, the duration of the "off" interval is made equal to or greater than a predetermined minimum, the condensate will not only be withdrawn into the risers but will also have opportunity to flow into the steam main and out through the steam trap 40. Thus, during the succeeding "on" period, the piping will be free for admittance of the desired predetermined quantity of steam accurately controlled and distributed without any irregular or unintended obstruction by condensate.

Because of the fact that the above described main steam valve and operating equipment are such that a large quantity of steam may be promptly admitted to the system at the beginning of each "on" period, a sufficient pressure may be made available for a moment at the outset of each such period to clear the piping of any troublesome remaining condensate which might otherwise interfere with the proper distribution of the steam. Thus the control equipment is particularly adaptable for application to existing installations of inferior design from which the condensate may not ordinarily properly drain away.

The above described systems are adaptable for use with large heating installations divided into a plurality of zones in the manner shown in my copending application Ser. No. 19,397.

The copending application of Samuel M. Brooks, Ser. No. 19,357, filed May 2, 1935, discloses a type of orifice arrangement particularly adaptable for use with the above described "one-pipe" systems.

While the invention has been described with respect to certain particular preferred examples which give satisfactory results, it will be understood by those skilled in the art, after understanding the invention, that various changes and modifications may be made without departing from the spirit and scope of the invention, and it is intended, therefore, in the appended claims to cover all such changes and modifications.

What is claimed as new and desired to be secured by Letters Patent of the United States is:

1. In combination, in a steam heating system, a steam supply main, a valve therein, apparatus for first widely opening said valve and for then accurately regulating the extent to which said valve is opened in accordance with pressure conditions in said steam main and for then closing the valve and for repeating the same cycle of operations during each of a succession of relatively short spaced periods with short intervals between periods, said apparatus comprising an operating member connected to said valve, a source of power independent of the steam supplied to the system, a body of fluid maintained under pressure by said source of power and acting on said member to determine its position, a pilot valve for regulating the application of said fluid to said member, means for positioning said pilot valve in accordance with pressure conditions in said steam main whereby when the steam supply is excessive the pilot valve regulates the application of said fluid so as to cause adjustment of said member in a direction tending to close said valve, and means for automatically turning on and shutting off respectively said source of power at the beginning and ending of each of said periods.

2. In combination, in a steam heating system, a supply main, a valve therein, a plurality of radiators connected to said supply main, a closed return piping system therefor, apparatus for first widely opening said valve and for then accurately regulating the extent to which said valve is opened in accordance with the difference between the supply and return pressures of the system and for then closing the valve and for repeating the same cycle of operations during each of a succession of relatively short spaced periods with short intervals between periods, said apparatus comprising an operating member connected to said valve, a source of power independent of the steam supplied to the system, a body of fluid maintained under pressure by said source of power and acting on said member to determine its position, a pilot valve for regulating the application of said fluid to said member, means for positioning said pilot valve in accordance with the difference between the steam pressure in the supply main and the pressure in the return piping whereby when such difference is increased the pilot valve regulates the application of said fluid so as to cause adjustment of said member in a direction tending to close said valve, and means for automatically turning on and shutting off respectively said source of power at the beginning and ending of each of said periods.

3. In combination, in a steam heating system, a steam supply main, a valve therein, apparatus for first widely opening said valve and for then accurately regulating the extent to which said valve is opened in accordance with pressure conditions in said steam main and for then closing the valve and for repeating the same cycle of operations during each of a succession of relatively short spaced periods with short intervals between periods, said apparatus comprising an operating member connected to said valve, a source of power independent of the steam supplied to the system, a body of fluid maintained under pressure by said source of power and acting on said member to determine its position, a pilot valve for regulating the application of said fluid to said member, means for positioning said pilot valve in accordance with pressure conditions in said steam main whereby when the steam supply is excessive the pilot valve regulates the application of said fluid so as to cause adjustment of said member in a direction tending to close said valve, means for automatically turning on and shutting off respectively said source of power at the beginning and ending of each of said periods, and a valve for quickly releasing the fluid pressure applied to said member in response to the shutting off of said source of power.

4. In combination, in a steam heating system, a steam supply main, a valve therein, apparatus for first widely opening said valve and for then accurately regulating the extent to which said valve is opened in accordance with pressure conditions in said steam main and for then closing the valve and for repeating the same cycle of operations during each of a succession of relatively short spaced periods with short intervals between periods, said apparatus comprising an operating member connected to said valve, a source of power independent of the steam supplied to the system, a body of fluid maintained under pressure by said source of power and acting on said member to determine its position, a pilot valve for regulating the application of said fluid to said member, means for positioning said pilot valve in accordance with pressure conditions in said steam main whereby when the steam supply is excessive the pilot valve regulates the application of said fluid so as to cause adjustment of said member in a direction tending to close said valve, and thermostatically controlled means for automatically turning on and shutting off respectively said source of power at the beginning and ending of each of said periods and for regulating the length of said periods substantially in proportion to changes in the prevailing temperature external to the spaces heated by the system whereby the proportion of elapsed time occupied by the steam admission periods is increased upon increases in the heat requirements of the system.

5. In combination, in a steam heating system, a steam supply main, a valve therein, apparatus for first widely opening said valve and for then accurately regulating the extent to which said valve is opened in accordance with pressure conditions in said steam main and for then closing the valve and for repeating the same cycle of operations during each of a succession of relatively short spaced periods with short intervals between periods, said apparatus comprising an operating member connected to said valve, a source of power independent of the steam supplied to the system, a body of fluid maintained under pressure by said source of power and acting on said member to determine its position, a pilot valve for regulating the application of said fluid to said member, means for positioning said pilot valve in accordance with pressure conditions in said steam main whereby when the steam supply is excessive the pilot valve regulates the application of said fluid so as to cause adjustment of said member in a direction tending to close said valve, a receptacle for providing a supply of said fluid, said apparatus comprising a unitary assembly mounted in connection with said receptacle, and means for automatically turning on and shutting off respectively said source of power at the beginning and ending of each of said periods.

6. Apparatus for providing a regulated supply of steam to a steam heating system comprising in combination a steam supply main, valve means in said main, means for operating said valve means to substantially check the flow of steam therethrough during each of a succession of relatively short spaced periods with short intervals between periods, said means including an operating member connected to said valve means, a source of power independent of the steam supplied to the system, a body of fluid maintained under pressure by said source of power and acting on said member to determine its position, a pilot valve for regulating the application of said fluid to said member, means for adjusting the position of said pilot valve upon changes in pressure conditions in the heating system whereby when the steam supply is excessive, the pilot valve regulates the application of said fluid so as to cause adjustment of said member in a direction tending to close said valve means, and adjustable time controlled means arranged to substantially decrease the application of said fluid to said member for causing said valve means to be substantially closed during each of said periods and whereby the proportion of elapsed time occupied by each of said periods is increased upon a decrease in the heating requirements of the system.

KARL W. ROHLIN.